United States Patent
Schaust et al.

(10) Patent No.: US 10,473,544 B2
(45) Date of Patent: Nov. 12, 2019

(54) DEVICE AND A METHOD FOR MEASURING A FLUID PRESSURE AND FOR VERIFYING THE FLUID PRESSURE THAT HAS BEEN MEASURED

(71) Applicant: Lucas Automotive GmbH, Koblenz (DE)

(72) Inventors: Karlheinz Schaust, Fachbach (DE); Klaus Ullmer, Koblenz (DE); Sven Michels, Lutzerath (DE)

(73) Assignee: Lucas Automotive GmbH, Koblenz (DE)

( * ) Notice: Subject to any disclaimer, the term of this patent is extended or adjusted under 35 U.S.C. 154(b) by 34 days.

(21) Appl. No.: 15/551,421

(22) PCT Filed: Jan. 18, 2016

(86) PCT No.: PCT/EP2016/050883
§ 371 (c)(1),
(2) Date: Aug. 16, 2017

(87) PCT Pub. No.: WO2016/131581
PCT Pub. Date: Aug. 25, 2016

(65) Prior Publication Data
US 2018/0031433 A1    Feb. 1, 2018

(30) Foreign Application Priority Data
Feb. 16, 2015 (DE) .................. 10 2015 001 980

(51) Int. Cl.
*G01L 9/00*    (2006.01)
*G01L 9/04*    (2006.01)
*G01L 9/06*    (2006.01)

(52) U.S. Cl.
CPC .............. *G01L 9/0055* (2013.01); *G01L 9/04* (2013.01); *G01L 9/06* (2013.01)

(58) Field of Classification Search
CPC . G01L 9/0055; G01L 9/04; G01L 9/06; G01L 1/2262
(Continued)

(56) References Cited

U.S. PATENT DOCUMENTS 3,247,717 A    4/1966    Kemmer et al.
5,343,755 A    9/1994    Huss
(Continued)

FOREIGN PATENT DOCUMENTS

DE    1473505 A1    11/1968
DE    69411035 T2    10/1998
(Continued)

*Primary Examiner* — Nathaniel T Woodward
(74) *Attorney, Agent, or Firm* — MacMillan, Sobanski & Todd, LLC

(57) ABSTRACT

A device for measuring a fluid pressure and for verifying the fluid pressure that has been measured comprises a sensor element having a fluid chamber and an element that adjoins said fluid chamber and can be deformed under fluid pressure, a resistance bridge being arranged on the deformable element side that faces away from said fluid chamber, for the purpose of generating a transverse bridge voltage dependent on said fluid pressure. The device also comprises a voltage divider which is connected in parallel to said resistance bridge for generating a differential voltage.

11 Claims, 3 Drawing Sheets

(58) Field of Classification Search
USPC .......................................................... 73/727
See application file for complete search history.

(56) References Cited

U.S. PATENT DOCUMENTS

| | | | |
|---|---|---|---|
| 5,410,908 A | | 5/1995 | Erichsen |
| 6,116,269 A * | | 9/2000 | Maxson .............. F04B 27/1804 137/487.5 |
| 6,422,088 B1 * | | 7/2002 | Oba ........................ G01D 3/08 73/754 |
| 8,823,364 B2 * | | 9/2014 | Connolly ................ G01P 21/00 324/162 |
| 9,435,672 B2 | | 9/2016 | Chemisky et al. |

FOREIGN PATENT DOCUMENTS

| | | |
|---|---|---|
| DE | 10304024 A1 | 8/2003 |
| DE | 60028678 T2 | 5/2007 |
| DE | 102007043070 A1 | 3/2009 |
| DE | 102011002884 A1 | 12/2011 |
| DE | 102013205864 A1 | 10/2014 |
| DE | 102013206646 A1 | 10/2014 |
| EP | 1087219 A2 | 3/2001 |
| WO | 9727802 A1 | 8/1997 |

\* cited by examiner

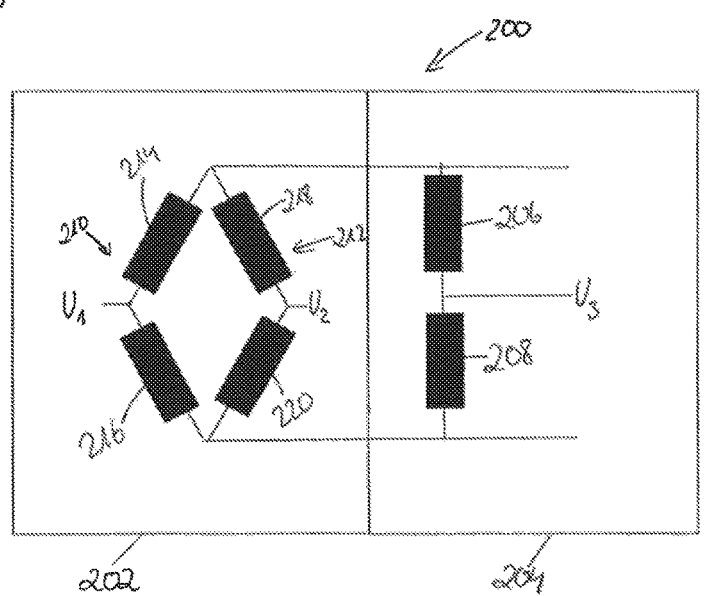
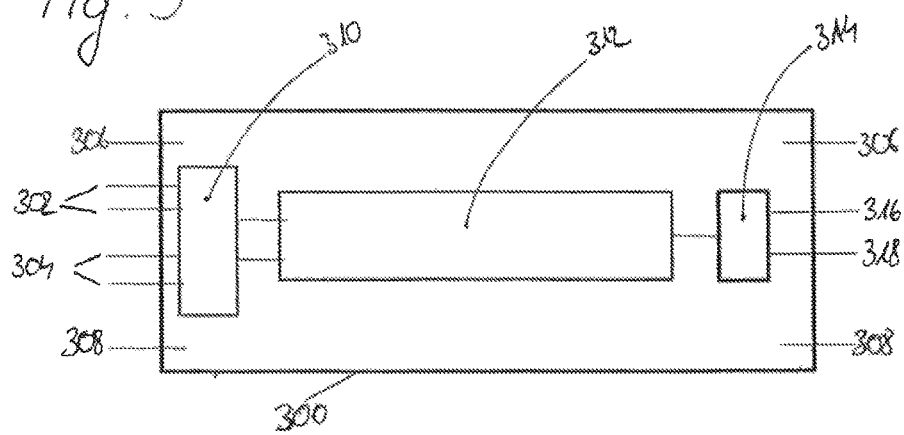

Fig. 4
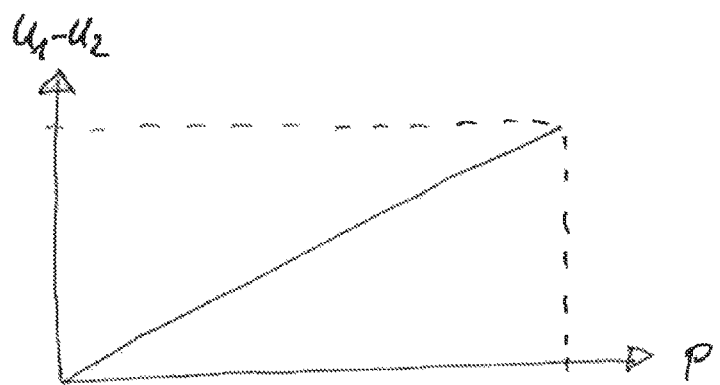
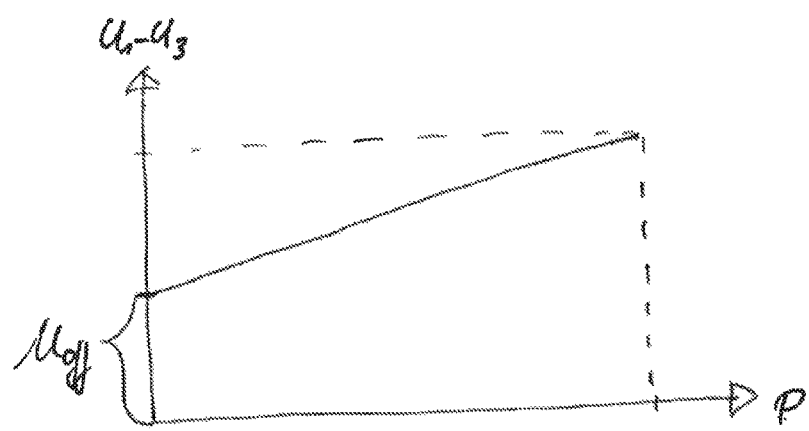

DEVICE AND A METHOD FOR MEASURING A FLUID PRESSURE AND FOR VERIFYING THE FLUID PRESSURE THAT HAS BEEN MEASURED

CROSS-REFERENCE TO RELATED APPLICATIONS

This application is the National Phase of International Application PCT/EP2016/050883 filed Jan. 18, 2016 which designated the U.S. and that International Application was published on Aug. 25, 2016 as International Publication Number WO 2016/131581 A1. PCT/EP2016/050883 claims priority to German Patent Application No. 10 2015 001 980.5, filed Feb. 16, 2015. Thus, the subject nonprovisional application claims priority to German Patent Application No. 10 2015 001 980.5, filed Feb. 16, 2015. The disclosures of both applications are incorporated herein by reference.

BACKGROUND OF THE INVENTION

The present disclosure relates to a hydraulic control unit comprising a device and to a method for measuring a fluid pressure and for verifying the fluid pressure that has been measured.

Devices for measuring a fluid pressure are used in many areas. For example, in the case of a hydraulic vehicle brake, an electronic control unit (ECU) drives an extremely wide variety of components, such as valves, depending on the pressure which is measured by the device in the fluid channels. Pressure sensors for measuring the fluid pressure often have a piezoresistive element, the resistance of said piezoresistive element changing in the event of deformation and said piezoresistive element being part of a resistance measurement bridge. A measure of the fluid pressure is then a voltage difference between the voltage dividers of the resistance measurement bridge. The voltage difference which is measured is then usually passed on for the purpose of further processing, and the signal which has been further processed is supplied to the electronic control unit.

In known solutions, additional components are used for verifying fault-free functioning of the resistance measurement bridge and the subsequent signal processing, said additional components resulting in additional costs. In addition, the additional components which serve for verifying the pressure measurement reduce the reliability of the components which serve for the actual pressure measurement since more complex structures are used for the resistance measurement bridge and the subsequent signal processing.

WO 97/27802 A discloses a device for measuring pressure, temperature and throughflow, which device is intended particularly for use in the medical field, such as for intracoronary pressure measurement for example. A circuit arrangement has two resistance measurement bridges. The first resistance measurement bridge is intended for throughflow measurement and for temperature compensation, and the second resistance measurement bridge is intended for pressure measurement. For the purpose of temperature compensation, the second resistance measurement bridge is calibrated before the actual measurement operation by the potential difference between points A and B being recorded as a function of the potential difference between points A and C at known temperatures. This previously determined calibration curve can then be used to determine an offset value by which the signal that has been measured in the actual measurement operation and is representative of the pressure is increased or reduced depending on the temperature.

DE 103 04 024 A1 discloses a method and a circuit arrangement for checking a pressure sensor arrangement in an electronically controlled motor vehicle brake system. The sensor arrangement has a resistance measurement bridge which is connected to an electrical evaluation circuit. A fault identification method is carried out in the electrical evaluation circuit by comparing the electrical output signals with setpoint values and comparison values.

U.S. Pat. No. 5,343,755 B discloses a pressure sensor comprising a resistance measurement bridge which generates a pressure-dependent transverse bridge voltage. The pressure sensor further has a resistance element which is electrically connected to the resistance measurement bridge and also to an amplifier for amplifying the temperature-dependent voltage drop at the resistance element.

EP 1 087 219 A2 discloses a pressure sensor comprising a resistance measurement bridge and a voltage divider which is connected in parallel to the resistance measurement bridge. The resistance measurement bridge is arranged on a diaphragm of a silicon substrate. The transverse bridge voltage of the resistance measurement bridge is representative of the pressure which acts on the diaphragm. Furthermore, a differential voltage between the resistance measurement bridge and the voltage divider is used to draw a conclusion about a possible malfunction of the resistance measurement bridge.

SUMMARY OF THE INVENTION

The aim is therefore to specify a hydraulic control unit comprising a device for measuring a fluid pressure and for verifying said fluid pressure, which hydraulic control unit avoids one or more of the disadvantages of the prior art.

The disclosed hydraulic control unit exhibits the features of patent claim 1.

According to one aspect, a device for measuring a fluid pressure and for verifying the fluid pressure that has been measured comprises a sensor element which has a fluid chamber and an element which adjoins the fluid chamber and can be deformed under fluid pressure. A resistance measurement bridge is arranged on that side of the deformable element which is averted from the fluid chamber, for the purpose of generating a transverse bridge voltage which is dependent on the fluid pressure. The device further has a voltage divider which is connected in parallel to the resistance measurement bridge, for the purpose of generating a differential voltage.

The resistance measurement bridge, which has a plurality of resistance elements, is provided for actually measuring the fluid pressure in the fluid chamber. A resistance element is typically in the form of a piezoresistive element, for example in the form of a strain gauge. The piezoresistive element is arranged at least in regions on the diaphragm, for example on that side of the diaphragm which is averted from the fluid chamber. A change in pressure of the liquid in the fluid chamber leads to deformation of the diaphragm and therefore also to deformation of the piezoresistive element which is arranged on said diaphragm, this resulting in a change in the resistance of the piezoresistive element. The change in the transverse bridge voltage which is measured and indicates a voltage difference between the voltage dividers of the resistance measurement bridge is then a measure of the change in fluid pressure in the fluid chamber.

In addition to this, the voltage divider which is connected in parallel to the resistance measurement bridge and by means of which a differential voltage is generated is provided. The differential voltage is a voltage difference between the voltage divider and the resistance measurement bridge. The arrangement comprising the resistance measurement bridge and the voltage divider can, for example, be calibrated such that the differential voltage and the transverse bridge voltage have a fixed correlation, which is independent of the fluid pressure, during problem-free operation of the arrangement. In one embodiment, a superordinate system can then perform a check during operation of the device to ascertain whether the correlation between the transverse bridge voltage and the differential voltage has been maintained. If this is no longer the case, this suggests faulty functioning of the pressure measuring device.

In the case of the described arrangement, the resistance measurement bridge which serves for the actual pressure measurement is usually configured no differently than in the case of a device which serves only for pressure measurement and not for verifying the ascertained pressure. That is to say, the actual arrangement for pressure measurement has no additional components in some realizations, but only the voltage divider which is connected in parallel to the resistance measurement bridge and serves for verifying the resistance measurement bridge. Therefore, the additional verification function does not have an adverse effect on the reliability of the resistance measurement bridge. In addition, the described solution constitutes a cost-effective way of verifying the device for measuring a fluid pressure during operation of said device.

The measuring device in the hydraulic control unit can be used to drive, for example, valves of the hydraulic control unit depending on the fluid pressure that has been measured. The sensor element of the pressure measuring device can be a unit which is separate from the rest of the hydraulic control unit and is fastened to a connection surface of the hydraulic control unit. Said unit can be fastened to said connection surface by clinching for example.

In one embodiment, the voltage divider has two resistance elements which are connected in series.

In a further embodiment, the resistance measurement bridge has two voltage dividers which are connected in parallel and each have two resistance elements which are connected in series. One of the resistance elements can then be a piezoresistive element, such as a strain gauge, and a change in the resistance of the piezoresistive element then leads to a change in the transverse bridge voltage. The transverse bridge voltage indicates the voltage difference between the two voltage dividers of the resistance measurement bridge. The differential voltage can then indicate a voltage difference between the voltage divider which is connected in parallel to the resistance measurement bridge and one of the voltage dividers of the resistance measurement bridge.

In another refinement, the measuring device has an electronic signal processing component which has a first input for applying the bridge voltage and a second input for applying the differential voltage, and a multiplexer which alternately selects the transverse bridge voltage and the differential voltage for the purpose of further processing by the electronic signal processing component. The components for the actual signal processing which adjoin the multiplexer serve for processing the transverse bridge voltage, for example for compensating for temperature influences. The differential voltage and the transverse bridge voltage are alternately processed by the multiplexer and, given suitable calibration of the device, the two signals that have been processed have a fixed correlation which is independent of the fluid pressure. If this correlation is no longer present, this can suggest not only a fault in the actual pressure measuring arrangement but rather also a fault in the subsequent signal processing. Therefore, the described system can be used not only to identify faulty behavior of the resistance measurement bridge but also faults in the subsequent signal processing. In some implementations, the actual signal processing is not of redundant design, so that the reliability of the actual signal processing does not drop due to the verification.

In one refinement of the present disclosure, the electronic signal processing component has an amplifier for the signal which is selected by the multiplexer.

In a further refinement, the resistance measurement bridge and the voltage divider which is connected in parallel to the resistance measurement bridge are designed such that the transverse bridge voltage and the differential voltage have a correlation which is independent of the fluid pressure. The resistance measurement bridge is designed, for example, such that the respective half-bridges have a fixed known ratio in relation to one another. This leads to a linear relationship between the transverse bridge voltage and the differential voltage. Given identical design of the half-bridges, the differential voltage that has been processed exhibits, for example, only half the amplification of the transverse bridge voltage that has been processed. The design of the voltage divider is reflected in an offset voltage between the differential voltage and the transverse bridge voltage.

In a further refinement, the voltage divider is arranged on the element which can be deformed under fluid pressure. Said voltage divider is in this case arranged such that it does not change when there is a change in the fluid pressure.

In another refinement, the electronic signal processing component has the voltage divider.

The present disclosure also provides a vehicle brake system which comprises the above-described hydraulic control unit. The output signals from the pressure measuring device are usually supplied to an electronic control unit which then drives valves of the hydraulic control unit depending on said output signals.

The present disclosure further provides a method for measuring a fluid pressure and for verifying the fluid pressure that has been measured, said method being able to verify the measured fluid pressure in a simple and cost-effective manner, without reducing the reliability of the arrangement which serves for the actual pressure measurement.

The disclosed method exhibits the features of patent claim 11.

One embodiment provides a method for measuring a fluid pressure and for verifying the fluid pressure that has been measured, comprising a sensor element which has a fluid chamber and an element which adjoins the fluid chamber and can be deformed under fluid pressure, and comprising a resistance measurement bridge which is arranged on that side of the element, which can be deformed under fluid pressure, which is averted from the fluid chamber, and comprising a voltage divider which is connected in parallel to the resistance measurement bridge, which method comprises the following steps:

determining a transverse bridge voltage, which is dependent on the fluid pressure, by means of the resistance measurement bridge, determining a differential voltage between the voltage divider which is connected in parallel to the resistance measurement bridge and the resistance measurement bridge, determining a correlation between the transverse bridge voltage and the differential voltage for verifying the bridge voltage.

The correlation between the transverse bridge voltage and the differential voltage can be used to identify whether the determined fluid pressure is faulty. The correlation between the two signals is a fixed variable which is already known and is independent of the fluid pressure in the fluid chamber. If the correlation differs from the correlation which is already known, this suggests a fault in the signal chain. In some variants, the resistance measurement bridge by means of which the transverse bridge voltage is determined has no additional elements, and therefore the reliability of the actual pressure measurement is not reduced by any complex structures for verifying the pressure that has been measured.

In a further embodiment, the resistance measurement bridge has two voltage dividers which are connected in parallel, wherein, when the differential voltage is determined, a voltage difference between the voltage divider which is connected in parallel to the resistance measurement bridge and one of the voltage dividers of the resistance measurement bridge is determined.

In a yet further embodiment, the resistance measurement bridge and the voltage divider which is connected in parallel to the resistance measurement bridge are designed such that the bridge voltage and the differential voltage have a correlation which is independent of the fluid pressure.

In a further development, in an electronic signal processing component, the bridge voltage and the differential voltage are alternately selected for the purpose of further processing by the electronic signal processing, and the differential voltage that has been processed is used for verifying the bridge voltage that has been measured and processed.

Various aspects of this invention will become apparent to those skilled in the art from the following detailed description of the preferred embodiment, when read in light of the accompanying drawings.

BRIEF DESCRIPTION OF THE DRAWINGS

FIG. 2 schematically shows a plan view of an exemplary embodiment of an arrangement which has a resistance measurement bridge and a voltage divider which is connected in parallel to said resistance measurement bridge;

FIG. 3 schematically shows an electronic signal processing component for processing the signals which are output by the arrangement shown in FIG. 2; and FIG. 4 schematically shows the profile of the transverse bridge voltage and of the differential voltage depending on the fluid pressure.

DETAILED DESCRIPTION OF THE PREFERRED EMBODIMENT

Figure 1:
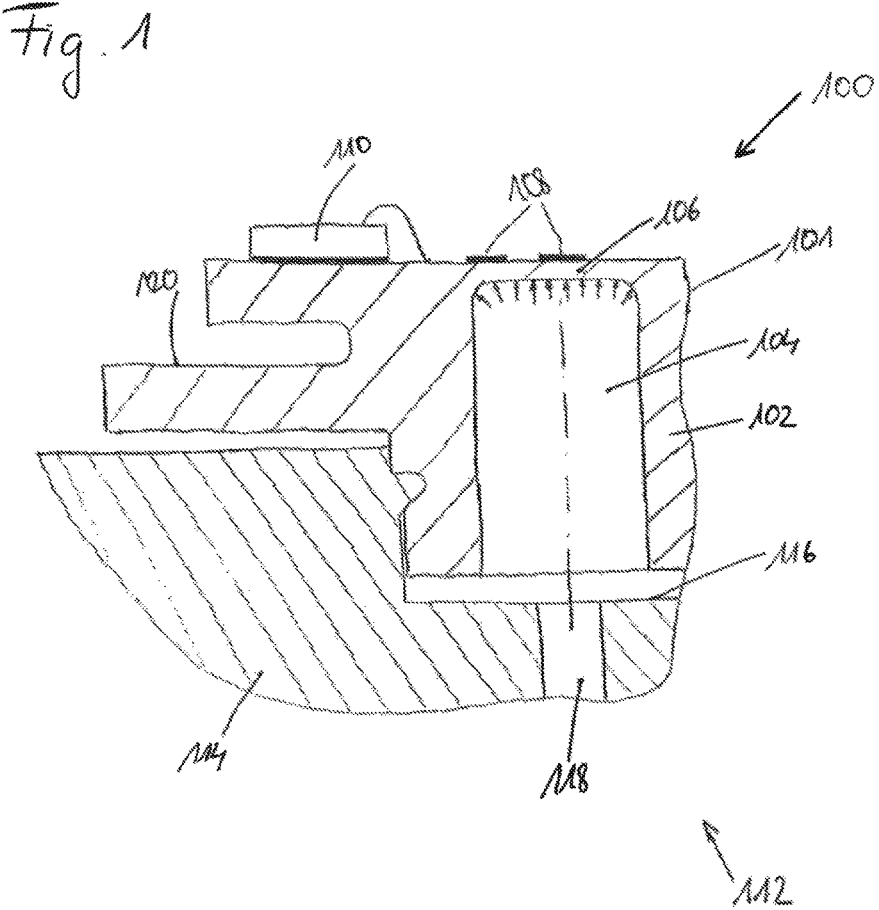
FIG. 1 shows a sectioned side view of a portion of a hydraulic control unit, comprising a device for measuring a fluid pressure and for verifying the fluid pressure that has been measured, according to one embodiment.

The exemplary embodiments explained below provide a technique for measuring a fluid pressure and for verifying the fluid pressure that has been measured, said technique being simple and therefore cost-effective and not reducing the reliability of the arrangement which serves for the actual pressure measurement.

FIG. 1 schematically shows a sectioned side view of a device 100 for measuring a fluid pressure and for verifying the fluid pressure that has been measured. The device has a sensor element 101 comprising a housing 102 in which a fluid chamber 104 is formed. A diaphragm 106 adjoins the fluid chamber 104 and forms an element which can be deformed under fluid pressure. The sensor element 101 has a resistance measurement bridge 108 on that side of the diaphragm 106 which is at the top in FIG. 1, that is to say on that side of the diaphragm 106 which is averted from the fluid chamber 104. The resistance measurement bridge 108 has at least one strain gauge, the resistance of which changes in the event of deformation. In the example present here, two strain gauges which are arranged perpendicular to one another are provided in order to detect the deformation of the diaphragm in two different directions which are perpendicular to one another. Furthermore, an electronic signal processing component 110 which is electrically connected to the resistance measurement bridge 108 is arranged on the housing 102 of the sensor element 101.

In the example shown here, the sensor element 101 is connected to a hydraulic control unit 112. The sensor element 101 is fastened to a connection surface 116 of the hydraulic control unit 112, so that there is a fluid connection between the fluid chamber 104 of the sensor element 101 and a fluid channel 118 of the hydraulic control unit 112. In the example shown here, the sensor element 101 is fastened to the hydraulic control unit 112 by clinching. To this end, the sensor element 101 has a planar surface 120 on which the pressure for clinching purposes can be exerted. However, the sensor element 101 can also be fastened to the hydraulic control unit 112 in a different way.

FIG. 2 shows an arrangement 200 which is part of the device 100 for measuring the fluid pressure and for verifying said fluid pressure. The arrangement 200 comprises a resistance measurement bridge 202, which corresponds to FIG. 1 and is arranged on the diaphragm 106 and serves to convert the deformation of the diaphragm 106 by the fluid pressure into an electrical signal, and a voltage divider 204 which is connected in parallel to said resistance measurement bridge. The voltage divider 204 has two resistance elements 206, 208 which are connected in series, and the resistance measurement bridge 202 has two voltage dividers 210, 212 which are connected in parallel and each have two resistance elements 214, 216 and, respectively, 218, 220 which are connected in series.

A measure of the deformation of the diaphragm 106 on which the resistance measurement bridge 108 or 202 is arranged is the so-called transverse bridge voltage. The transverse bridge voltage indicates the voltage difference between the voltage dividers 210, 212 of the resistance measurement bridge 202. In the exemplary embodiment shown here, the voltage $U_1$ is applied between the two resistance elements 214, 216 of the first voltage divider 210 of the resistance measurement bridge 202, and the voltage $U_2$ is applied between the two resistance elements 218, 220 of the second voltage divider 212 of the resistance measurement bridge 202. The transverse bridge voltage is the voltage difference between the voltages $U_1$ and $U_2$, that is to say $U_1-U_2$.

A voltage $U_3$ is applied between the two resistance elements 206, 208 of the voltage divider 204 which is connected in parallel to the measurement bridge 202. The voltage divider 204 which is connected in parallel serves to ascertain a differential voltage which indicates the voltage difference between the voltage divider 204 which is connected in parallel to the resistance measurement bridge 202 and one of the voltage dividers 210, 212 of the resistance measurement bridge 202. In the example present here, the differential voltage is formed by the voltage difference between the voltage $U_1$ and the voltage $U_3$, that is to say $U_1-U_3$.

At least one of the resistance elements 214, 216, 218, 220 is in the form of a strain gauge, the resistance of which changes in the event of deformation. In the example shown here, all four resistance elements 214, 216, 218, 220 are in the form of strain gauges. The resistance measurement bridge 202 is therefore in the form of a full bridge.

FIG. 3 shows an electronic signal processing component 300 for processing the voltage signals of the arrangement 200 shown in FIG. 2 in more detail. The electronic signal processing component 300 corresponds to the electronic signal processing component 110 shown in FIG. 1.

The electronic signal processing component 300 has a first input 302 for the transverse bridge voltage $U_1-U_2$, and a second input 304 for the differential voltage $U_1-U_3$. Furthermore, said electronic signal processing component has an input 306 for the supply voltage and a further input 308 for connection to ground.

Furthermore, the electronic signal processing component 300 comprises a multiplexer 310, an amplifier 312 which follows the multiplexer 310 and an output divider 314 which follows the amplifier 312 and switches over between a first output 316 for the transverse bridge voltage that has been processed and a second output 318 for the differential voltage that has been processed. The output signals from the electronic signal processing component 300 can serve to be supplied to an electronic control unit (ECU), not shown, which can in turn drive various components of the hydraulic control unit 112 (HCU).

The electronic signal processing component 300 can comprise even more functions than the functions shown in FIG. 3. For example, said electronic signal processing component can fulfill calibration functions and compensate for undesired effects, such as temperature influences for example.

The voltage divider 204 which is connected in parallel to the resistance measurement bridge 202 and is usually a fixed voltage divider is arranged either on the diaphragm 106 or on a separate printed circuit board, not shown here. When said voltage divider is arranged on the diaphragm 106, it is not of piezoresistive design. As a further alternative to this, said voltage divider is arranged in the electronic signal processing component 300 of FIG. 3.

In the event of deformation of the diaphragm 106 by a fluid which is adjacent to the diaphragm 106, the electrical resistance of the strain gauges 214, 216, 218, 220 changes, this leading to a change in the transverse bridge voltage $U_1-U_2$. That is to say, the change in the transverse bridge voltage $U_1-U_2$ is a measure of the change in pressure of the fluid which is provided in the fluid chamber 104. The transverse bridge voltage $U_1-U_2$ is supplied to the electronic signal processing component 300 via the first input 302. In addition, the differential voltage $U_1-U_3$ is supplied to the electronic signal processing component 300 via the second input 304. The multiplexer 310 switches over alternately between the differential voltage $U_1-U_3$ and the transverse bridge voltage $U_1-U_2$. The respectively selected signal is amplified in the amplifier 312. The output divider 314 switches over between the first output 316 for the transverse bridge voltage that has been processed or amplified and the second output 318 for the differential voltage that has been processed or amplified. The output signals from the electronic signal processing component 300 are supplied, for example, to an electronic control unit (ECU) in which the correlation between the transverse bridge voltage and the differential voltage can also be monitored. The ECU usually also has an analog/digital converter.

FIG. 4 shows the profile of the transverse bridge voltage $U_1-U_2$ with respect to the fluid pressure p, and the profile of the differential voltage $U_1-U_3$ with respect to the fluid pressure p. The transverse bridge voltage $U_1-U_2$ substantially exhibits a linear profile as the fluid pressure increases. The differential voltage $U_1-U_3$ likewise exhibits a substantially linear profile as the fluid pressure increases, with a gradient which is different from the profile of the transverse bridge voltage $U_1-U_2$. Furthermore, the differential voltage $U_1-U_3$ has an offset voltage $U_{off}$ in comparison to the transverse bridge voltage $U_1-U_2$, which offset voltage is given by the resistance values of the resistance elements of the voltage divider 204. In the arrangement of FIG. 2, the offset is $R_{208}/(R_{206}+R_{208})$, where $R_{206}$ and $R_{208}$ are the resistance value of the resistance element 206 and, respectively, 208 of the voltage divider 204.

As shown in FIG. 4, given corresponding design of the resistance measurement bridge 202 and of the voltage divider 204, the transverse bridge voltage $U_1-U_2$ and the differential voltage $U_1-U_3$, and therefore also the output signals at the first output 316 and at the second output 318 of the electronic signal processing component 300 have a fixed correlation which is independent of the fluid pressure. If the resistance measurement bridge 202 is designed, for example, such that the respective half-bridges 216, 220 and, respectively, 214, 218 of the resistance measurement bridge 202 have a fixed, known ratio in relation to one another, there is a specific (for example fixed or linear) relationship between the two signals (for example the gradients thereof). If the two half-bridges 216, 220 and, respectively, 214, 218 are of identical design for example, the second output signal, that is to say the differential voltage $U_1-U_3$ that has been processed, exhibits half the amplification in comparison to the first output signal, that is to say in comparison to the transverse bridge voltage $U_1-U_2$ that has been processed.

The voltage $U_3$ of the voltage divider 204 is selected such that the differential voltage $U_1-U_3$ lies within the signal range of the differential bridge.

As described above, the design of the voltage divider 204, that is to say the ratio of the resistance elements 206, 208 of the voltage divider, is reflected in the offset voltage $U_{off}$ which has the differential voltage $U_1-U_3$ in comparison to the transverse bridge voltage $U_1-U_2$. Given problem-free operation of the device, the offset voltage is generally a fixed variable which is independent of the fluid pressure.

In order to check the above-described device 100 for a possible malfunction, the transverse bridge voltage $U_1-U_2$ which is dependent on the fluid pressure is determined by means of the resistance measurement bridge 202 in a first step. In a further step, the differential voltage $U_1-U_3$ between the voltage divider 204 which is connected in parallel to the resistance measurement bridge 202 and the resistance measurement bridge 202 is determined. A correlation between the transverse bridge voltage and the differential voltage is then determined for the purpose of verifying the transverse bridge voltage. Given suitable calibration and design of the device 100, this correlation is a fixed variable which is already known and is independent of the fluid pressure that has been measured.

In the electronic signal processing component 300, the transverse bridge voltage and the differential voltage are alternately selected by means of the multiplexer 310 for the purpose of further processing. The output divider 314 switches over between the first output 316 and the second output 318. The signals which are output are then passed on to an electronic signal processing component (ECU), not shown, which monitors the correlation between the first and the second output signal in respect of the fixed correlation which is already known.

If it is established during operation of the device 100 that the specified correlation, which is already known, between the output signal $U_1-U_3$ and the second output signal $U_1-U_2$ is no longer maintained, this suggests a malfunction in the signal chain of the device. In this way, faults in the device can be identified during operation of the device 100 for measuring a fluid pressure. The fault can lie, for example, in one of the half-bridges of the resistance measurement bridge 202, and/or also in the signal processing of the electronic signal processing component 300.

Accordingly, the device presented here can be used to check the device 100 for a possible malfunction during operation of the device 100, that is to say during measurement of the fluid pressure of the fluid contained in the fluid chamber. Said check is performed using the resistance measurement bridge 202 and the voltage divider 204 which is connected in parallel to said resistance measurement bridge, wherein the resistance measurement bridge 202, which serves for the actual pressure measurement, does not have any additional, complex structures, so that the reliability of the resistance measurement bridge 202 is not reduced. In addition, the actual signal processing in the electronic signal processing component 300 is not of redundant design, so that the reliability of the signal processing component 300 for processing a signal which reflects the fluid pressure in the fluid chamber 104 is not reduced either. Owing to the use of the multiplexer, one amplifier is furthermore sufficient, as is also the case when processing only one input signal, as a result of which costs can be saved.

Since the verification of the signal that has been measured does not require any additional, complex structures, this additionally constitutes a cost-effective solution.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A hydraulic control unit comprising a device for measuring a fluid pressure and for verifying the fluid pressure that has been measured, wherein the device comprises:
   a sensor element which has a fluid chamber and an element which adjoins the fluid chamber and can be deformed under fluid pressure, wherein a resistance measurement bridge is arranged on that side of the deformable element which is averted from the fluid chamber, for generating a transverse bridge voltage which is dependent on the fluid pressure,
   a voltage divider which is connected in parallel to the resistance measurement bridge, for generating a differential voltage between the voltage divider which is connected in parallel to the resistance measurement bridge and the resistance measurement bridge, and
   an electronic signal processing component which is designed to alternately select the transverse bridge voltage and the differential voltage for the purpose of further processing by the electronic signal processing component, wherein the differential voltage that has been processed is used for verifying the transverse bridge voltage that has been measured and processed,
   wherein the resistance measurement bridge and the voltage divider which is connected in parallel to the resistance measurement bridge are designed such that the transverse bridge voltage and the differential voltage have a correlation which is independent of the fluid pressure.

2. The control unit of claim 1, wherein the voltage divider has two resistance elements which are connected in series.

3. The control unit of claim 2, wherein the voltage divider is arranged on the element which can be deformed under fluid pressure such that the voltages which are applied to the two resistance elements are independent of the fluid pressure.

4. The control unit of claim 1, wherein the resistance measurement bridge has two voltage dividers which are connected in parallel and each has two resistance elements which are connected in series.

5. The control unit of claim 4, wherein the differential voltage indicates a voltage difference between the voltage divider which is connected in parallel to the resistance measurement bridge and one of the voltage dividers of the resistance measurement bridge.

6. The control unit of claim 1, wherein the electronic signal processing component has a first input for applying the transverse bridge voltage and a second input for applying the differential voltage, and comprising a multiplexer which is designed to alternately select the transverse bridge voltage and the differential voltage for the purpose of further processing by the electronic signal processing component.

7. The control unit of claim 6, wherein the electronic signal processing component has an amplifier for the signal which is selected by the multiplexer.

8. The control unit of claim 6, wherein the electronic signal processing component has the voltage divider.

9. A vehicle brake system comprising the hydraulic control unit according to claim 1.

10. A method for measuring a fluid pressure and for identifying a possible malfunction of a device for measuring the fluid pressure of a hydraulic control unit according to claim 1, wherein the method comprises the following steps:
    determining a transverse bridge voltage, which is dependent on the fluid pressure, by means of the resistance measurement bridge,
    determining a differential voltage between the voltage divider which is connected in parallel to the resistance measurement bridge and the resistance measurement bridge,
    alternately selecting the transverse bridge voltage and the differential voltage in an electronic signal processing component for the purpose of further processing by the electronic signal processing component, and
    determining a correlation between the transverse bridge voltage that has been processed and the differential voltage that has been processed for identifying a possible malfunction of the device,
    wherein the resistance measurement bridge and the voltage divider which is connected in parallel to the resistance measurement bridge are designed such that the transverse bridge voltage and the differential voltage have a correlation which is independent of the fluid pressure.

11. The method of claim 10, wherein the resistance measurement bridge has two voltage dividers which are connected in parallel, and wherein, when the differential voltage is determined, a voltage difference between the voltage divider which is connected in parallel to the resistance measurement bridge and one of the voltage dividers of the resistance measurement bridge is determined.

* * * * *